(12) United States Patent
Ravel et al.

(10) Patent No.: US 12,367,304 B2
(45) Date of Patent: Jul. 22, 2025

(54) METHOD AND APPARATUS FOR DOCUMENT PROCESSING

(71) Applicants: Christian Ravel, Staines-upon-thames (GB); Hiroto Kobayashi, Staines-upon-thames (GB); Hiroshi Yamaguchi, Staines-upon-thames (GB); Guru Prasanna, Staines-upon-thames (GB); Loic Beylot, Staines-upon-thames (GB)

(72) Inventors: Christian Ravel, Staines-upon-thames (GB); Hiroto Kobayashi, Staines-upon-thames (GB); Hiroshi Yamaguchi, Staines-upon-thames (GB); Guru Prasanna, Staines-upon-thames (GB); Loic Beylot, Staines-upon-thames (GB)

(73) Assignee: Ricoh Company, Ltd., Tokyo (JP)

( * ) Notice: Subject to any disclaimer, the term of this patent is extended or adjusted under 35 U.S.C. 154(b) by 193 days.

(21) Appl. No.: 17/570,508

(22) Filed: Jan. 7, 2022

(65) Prior Publication Data
US 2022/0222362 A1 Jul. 14, 2022

(30) Foreign Application Priority Data
Jan. 11, 2021 (EP) .................................... 21150830

(51) Int. Cl.
*H04L 9/00* (2022.01)
*G06F 21/62* (2013.01)
(52) U.S. Cl.
CPC ................................ *G06F 21/6218* (2013.01)
(58) Field of Classification Search
CPC ............. G06F 21/6218; G06F 21/6227; G06F 21/6254; H04W 12/02
See application file for complete search history.

(56) References Cited

U.S. PATENT DOCUMENTS 9,998,525 B1   6/2018 Lipus et al.
2008/0204788 A1* 8/2008 Kelly ..................... G06T 11/60
                                              358/1.15

(Continued)

FOREIGN PATENT DOCUMENTS

JP   2002-269081   9/2002
JP   2007-299093   11/2007

(Continued)

OTHER PUBLICATIONS

Japanese Office Action for 2022-001738 mailed on Dec. 6, 2022.

(Continued)

*Primary Examiner* — Syed M Ahsan
(74) *Attorney, Agent, or Firm* — IPUSA, PLLC

(57) ABSTRACT

A computer device for data redaction application, the device includes
a communication interface configured to communicate with a data processing platform;
a memory unit configured to store metadata comprising redaction information received from the data processing platform and document data;
a preview generator configured to generate from the metadata and the document data a preview image indicating redactions to be applied to the document;
a display controller configured to transmit the preview image to a display; and a
metadata modification unit configured to modify the redaction information in response to a user action and to cause the preview generator to generate a modified preview image.

14 Claims, 18 Drawing Sheets

(56) References Cited

U.S. PATENT DOCUMENTS

| | | | |
|---|---|---|---|
| 2009/0019379 A1* | 1/2009 | Pendergast | G06F 16/93 715/762 |
| 2009/0323087 A1 | 12/2009 | Luo | |
| 2014/0033029 A1 | 1/2014 | Pittenger et al. | |
| 2017/0124347 A1* | 5/2017 | Kamata | G16H 10/60 |
| 2017/0177905 A1 | 6/2017 | Bhogal et al. | |
| 2020/0012817 A1* | 1/2020 | Damick | G06F 21/6254 |
| 2020/0125746 A1* | 4/2020 | Joshi | G06F 21/6245 |
| 2020/0267284 A1* | 8/2020 | Tong | G06V 30/413 |

FOREIGN PATENT DOCUMENTS

| | | |
|---|---|---|
| JP | 2018-026037 | 2/2018 |
| JP | 2019-082884 | 5/2019 |
| JP | 2020-170969 | 10/2020 |

OTHER PUBLICATIONS

Extended European Search Report for 21150830.4 mailed on Mar. 7, 2023.
Extended European Search Report for 21150830.4 mailed on May 16, 2024.
Communication pursuant to Article 94(3) EPC issued with respect to the corresponding European Patent Application 21150830.4.

* cited by examiner

METHOD AND APPARATUS FOR DOCUMENT PROCESSING

CROSS-REFERENCE TO RELATED APPLICATION

The present application is based on and claims priority under 35 U.S.C. § 119 to European Patent Application No. 21150830.4, filed on Jan. 11, 2021, the contents of which are incorporated herein by reference in their entirety.

BACKGROUND OF THE INVENTION

1. Field of the Invention

The present invention relates to processing of documents and in particular to the handling of sensitive information within documents.

2. Description of the Related Art

There is a continuing trend in many areas of industry and commerce to process and communicate documents in electronic form rather than on paper. Concerns about data privacy and security are also increasing. Therefore, there is a demand for improved methods for handling documents that contain sensitive or confidential information.

Some services for detecting and masking sensitive data in databases and data files are known, see for example U.S. Pat. No. 9,998,525.

However, these services and products have various drawbacks including a lack of user-friendliness, lack of automation and not being integrated into document workflows.

SUMMARY OF THE INVENTION

Accordingly there is a need for a more efficient and more user-friendly method for processing documents containing sensitive information.

According to the invention there is provided a computer device for data redaction application, the device comprising:
  a communication interface configured to communicate with a data processing platform;
  a memory unit configured to store initial metadata comprising redaction information received from the data processing platform and an electronic document;
  a preview generator configured to generate from the metadata and the electronic document a preview image indicating redactions to be applied to the electronic document;
  a display controller configured to transmit the preview image to a display; and
  a metadata modification unit configured to generate modified metadata in response to a user action and to cause the preview generator to generate a modified preview image.

According to the invention there is provided a computer-implemented method of data redaction comprising:
  receiving an electronic document at a computer device;
  receiving at the computer device initial metadata comprising redaction information for the electronic document from a data processing platform;
  displaying a preview image at the computer device in which the redaction is applied in accordance with the redaction information;
  modifying the redaction information in response to user input at the computer device and generating modified metadata; and
  updating the preview image in response to the modified metadata.

According to the invention there is provided a system configured for redacting data on an image data, comprising:
  a display;
  a computer device as described above; and
  a data processing platform having:
    an image encoding unit for determining the locations of text data in the electronic document and creating item metadata having the text data and location data of the text data;
    a data detection unit for generating, based on the item metadata, initial metadata comprising redaction information for redacting data in the electronic document;
    a network communication interface for communicating with the computer device to send the initial metadata to the computer device and receive the modified metadata containing the modified redaction information from the computer device;
    a data redacted image file creating unit for creating a data redacted image file from the electronic document and the modified redaction information; and
    a document file convertor for converting the data redacted image file into a previously decided format.

Embodiments of the invention can therefore reliably and efficiently redact sensitive information in an electronic document, allowing a user to effectively and efficiently control the redaction process to achieve a desired result.

BRIEF DESCRIPTION OF THE DRAWINGS

The invention will be described further below with reference to exemplary embodiments and the accompanying drawings, in which.

In the various drawings, like parts are denoted by like references.

DESCRIPTION OF THE EMBODIMENTS

Figure 1:
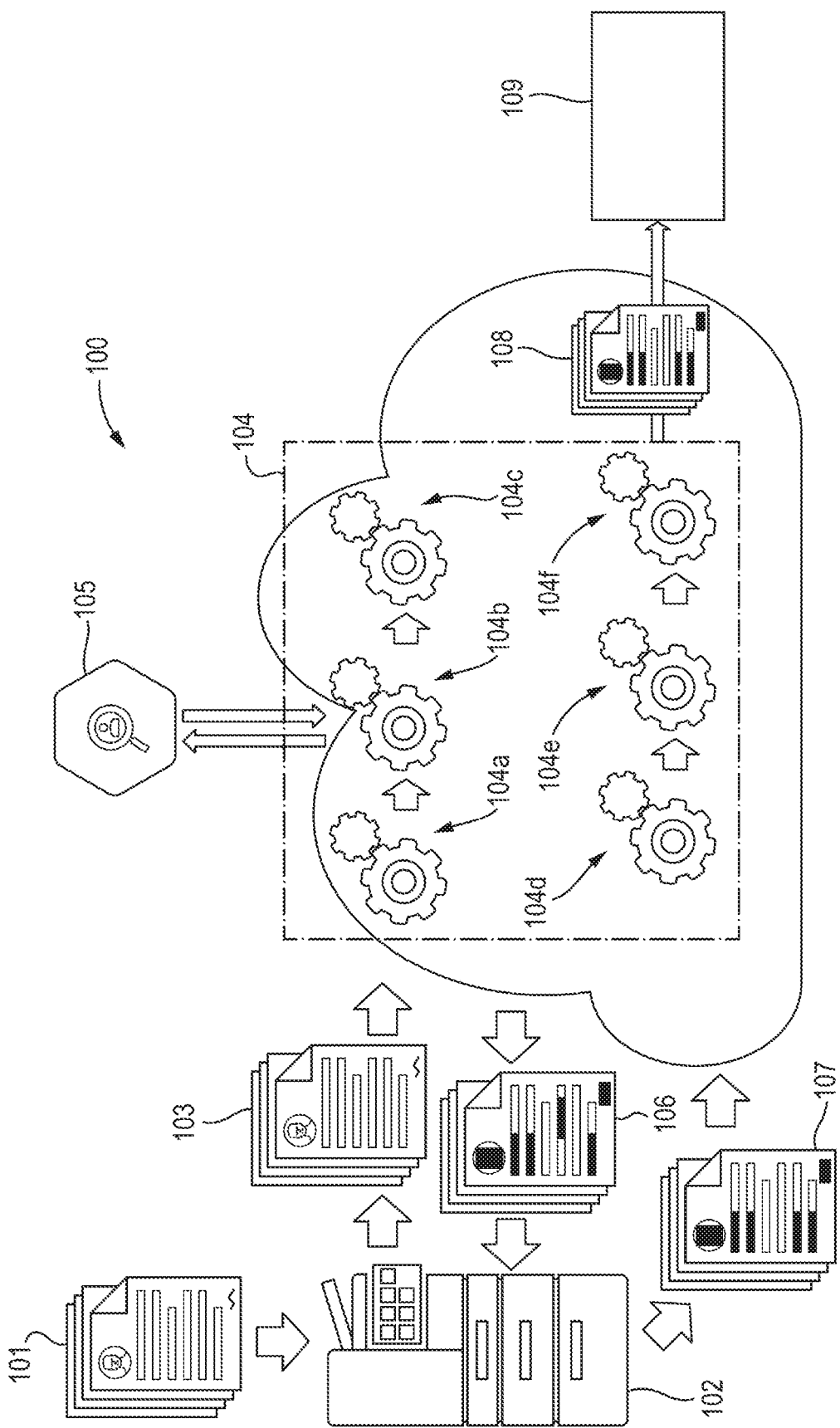
FIG. 1 shows a system in which the present invention can be implemented.

FIG. 1 shows one embodiment of an environment 100 in which an embodiment of the invention can be performed. The environment comprises a computer device 102 (Any types of computer device can be used (e.g. a multifunctional peripheral device (MFP), a personal computer, a laptop, a smart phone, a tablet computer, etc.) a data processing platform 104 (e.g. a remote server used to perform data processing at a remote location) and a communication destination 109 (e.g. an email server or a remote file storage service). Optionally, one or more auxiliary servers 105 may also be employed. The data processing platform 104 may comprise a single server or multiple servers, with different servers performing different functions or the same function. The data processing platform 104 may communicate with the auxiliary server 105 to perform some processing steps and/or obtain relevant information.

A summary of an exemplary method of the invention will now be given. A user may scan an original document 101 using the device 102 to generate document data in the form of an electronic document 103. The electronic document 103 is communicated to the data processing platform 104, e.g. via the Internet, another wide area network (WAN) or a local area network (LAN). The data processing platform 104 performs processes described in more detail below to detect sensitive data, or other data that is to be redacted, in the electronic document 103.

The data processing platform 104 returns initial metadata that describes proposed redactions to be performed on the electronic document 103. The initial metadata, which may also be referred to as masking metadata, can be provided in any suitable file format (e.g. JSON) and the file containing the metadata is referred to herein as a masking datafile. The masking datafile 106 may include a copy of the electronic document (in the original or an altered format) or may comprise only the minimum data necessary to define the proposed redactions. The data processing platform can send back to device 102 a version of the electronic document at a lower resolution than previously sent from the device 102.

Having received the masking datafile 106, the device 102 displays to the user the redactions that are proposed to be applied to the electronic document 103. The user is able to confirm or edit the redactions. When that process has been completed, the device 102 sends a confirmation datafile 107 containing modified metadata to the data processing platform 104. The modified metadata represents edited redactions over the initial metadata. Note that in case that the user does not modify the redaction, the modified metadata is identical to the initial metadata. Similarly to the masking datafile 106, the confirmation datafile may include a copy of the electronic document (in the original or an altered format) or may comprise only the minimum data necessary to define the proposed redactions. It should be noted that the electronic document and metadata can be communicated between the computer device and the data processing platform using other techniques than the exchange of files.

On receipt of the confirmation datafile 107 at the data processing platform 104, data redacted image file creating unit 104d performs a redaction process to generate a redacted document in which the redacted data is masked/obscured irreversibly and document converter 104e converts the data redacted image file to a desired output format (any suitable format can be used, e.g. portable document format) if necessary. As discussed further below, the redaction process can be any process that securely masks or obscures the selected information and creates output document 108. Output unit 104f communicates output document 108 to communication destination 109. Communication destination 109 may be, for example, an electronic mailbox, a cloud storage service, a document management system, etc. Communication destination 109 can be the computer device 102.

In broad outline, the process of detecting sensitive data performed by data processing platform 104 comprises three steps. First, image encoding unit 104a detects words in the electronic document 103. Image encoding unit may also be referred to as a word detector. If electronic document 103 is in a format that includes text data the image encoding unit 104a may simply extract words and word groups. In this context a "word" is considered to be any string of consecutive characters, digits or symbols in any language, with or without punctuation. If the electronic document 103 is a flat image file, or contains images, image encoding unit may perform a character or symbol detection and recognition process first.

Secondly, data detection unit 104b examines words and/or word groups to see if they are likely to be sensitive information or should otherwise be redacted. The term "sensitive data" or "sensitive information" is used herein to refer to any data that is potentially to be redacted, whether or not it is sensitive in any particular context. Several different methods of identifying sensitive information are possible and any suitable method or combination of methods may be used. Data detection unit 104b may utilize an external service to identify sensitive data, e.g. via API calls. Data detection unit 104b may be referred to as a sensitive data detector and may have multiple separate modules each for detecting sensitive information of a particular type, e.g. personal identifying information or medical information. Detected sensitive information is desirably labelled or tagged according to its type or category.

An example of a method for identifying sensitive information is to check words or groups of words against a dictionary of sensitive information. A dictionary of sensitive information might include names and medical terms. In such a method checking groups of words is important because the word "bond" on its own would not be considered sensitive but "Eric Bond" might be recognized as a name. Another method considers context of a document. For example if a part of a document is recognized as a form or table, information following a label such as "Name:" might be determined to be sensitive. Another method is to perform pattern matching. For example in a simplistic approach a sequence of sixteen digits arranged in four groups of four might be determined to be a credit card number. More complex tests can be applied to avoid false positives and detect cases where the number is formatted differently. Data detection unit 104b may employ suitably trained machine learning algorithm instances.

Thirdly, image classifier 104c examines any images in electronic document to see if they are sensitive. This step is optional. Examples of sensitive images may include signatures and photographs of people, especially faces. Image classifier 104c may comprise one or more trained machine learning algorithm instances. Image classifier 104c may use the OpenCV library or any other suitable computer vison library.

A method of detecting sensitive information may generate a score or probability that a text item (a word or word group) is sensitive information. In that case, a threshold can be applied to decide whether or not to redact each potentially item. The threshold may be predetermined or a user-selectable parameter. If multiple methods of detecting sensitive information are used, the score or probabilities may be combined to generate an aggregate score or the highest score may be used.

In an embodiment of the invention, the above process is controlled by the user at the user device 102. The user device may be any suitable computing device with a user interface, e.g. a multifunction peripheral printer, a personal computer, laptop, tablet, smartphone, personal digital assistant, etc. If the user device includes an image capture function, e.g. a document scanner (e.g. feed-through or flatbed) or camera, electronic document 103 may be created using the image capture function to capture an image of a physical original. Alternatively or in addition, electronic document 103 may be obtained from another source or generated by the user using word processing or other software on the user device.

Figure 6:
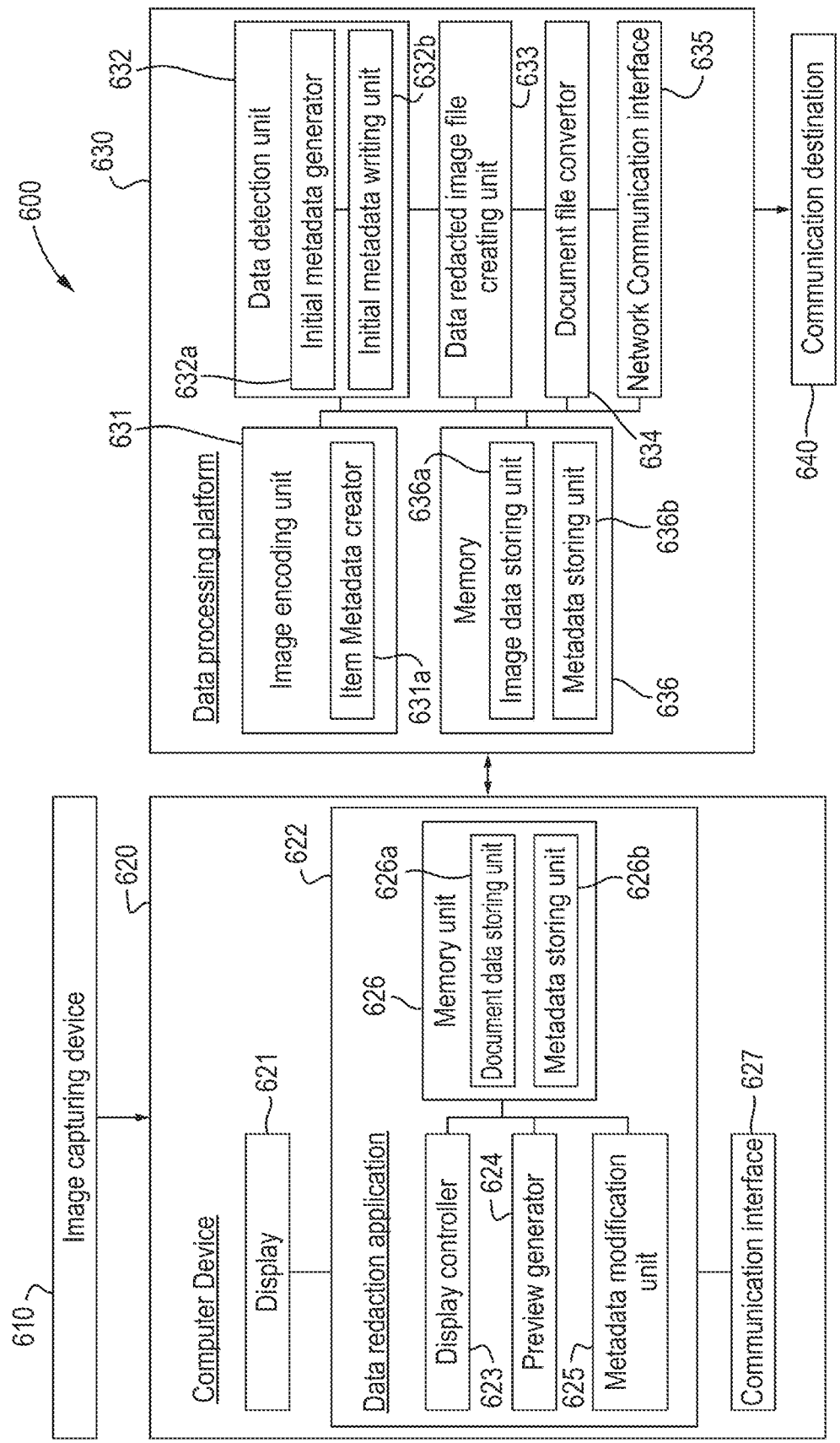
FIG. 6 shows a system of an embodiment of the invention.

A system of one embodiment of the invention 600 is shown in FIG. 6. The system 600 comprises at least a computer device 620 and a data processing platform 630. An image capturing device 610 is optional. The computer device 620, optionally including the image capturing device 610, is an example of the user device 102 and may be, for example, a multifunction peripheral device, a personal computer, a laptop, a smart phone, a tablet computer, etc. The computer device 620 has a display 621. Any type of display can be used as the display 621, for example an external display or a built-in display. The display may be either a touch sensitive display or non-touch sensitive display. An input device, such as a keyboard, key panel, touch pad, mouse or trackball may be provided. The computer device 620 also includes a data redaction application 622, a memory unit 626 and a communication interface 627. The data redaction application 622 includes at least a display controller 623, a preview generator 624, a metadata modification unit 625. The memory unit 626 includes a document data storing unit 626a and a metadata storing unit 626b. The communication interface 627 can be any suitable network interface, for example an Ethernet™ interface, a WiFi™ interface or a cellular modem.

The data redaction application 622 performs functions including: communicating with data processing platform 630 via communication interface 627; displaying previews of redacted documents via display 621; displaying configuration information to the user; receiving and acting upon user instructions to modify configuration and redaction settings; and storing document data and metadata. These functions are described further below in the context of the methods of the invention.

Data processing platform 630 includes an image encoding unit 631 which includes an item metadata creator 631a. There is also a data detection unit 632 including initial metadata generator 632a and initial metadata writing unit 632b. The data processing platform 630 further includes a data redacted image file creating unit 633, a document file converter 634 and a network communication interface 635. A memory 636 is also provided. Memory 636 may include an image data storing unit 636a and a metadata storing unit 636b.

Figure 7:
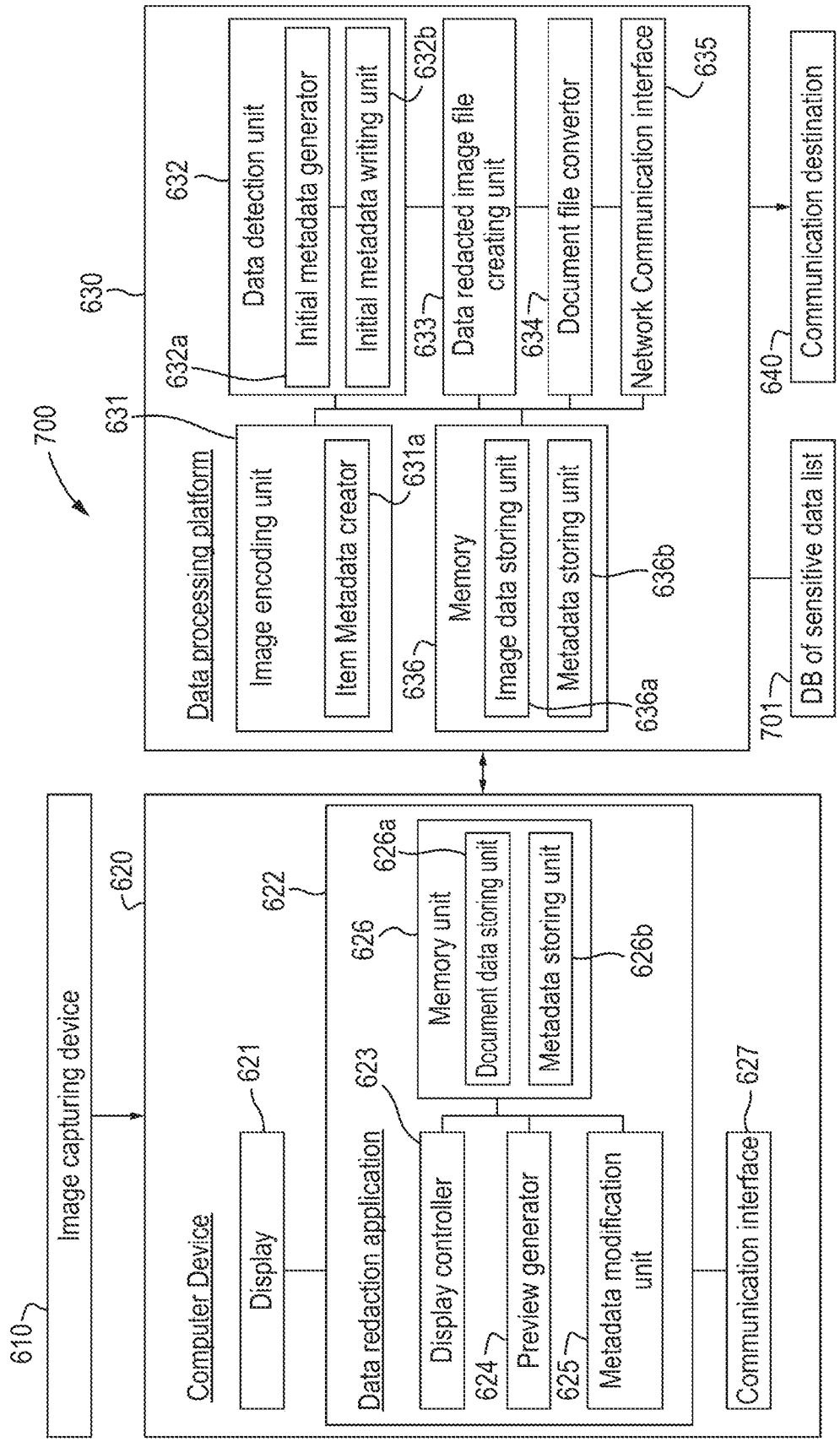
FIG. 7 shows a system according to an embodiment of the invention.

FIG. 7 shows a system 700 according to another embodiment of the invention. Parts of the system 700 of this embodiment that are the same as corresponding parts of the system 600 of the embodiment of FIG. 6 are denoted with the same reference numerals and a further description of them is omitted for brevity.

System 700 includes an image capturing device 610, a computer device 620, a data processing platform 630 and additionally comprises a database 701 containing specific items of sensitive data that are to be redacted. Database 701 may be a database specifically maintained for the purpose of identifying sensitive information to be redacted. Desirably, database 701 is a database that is maintained for another purpose but that contains sensitive information to be redacted. For example, database 701 may be an employee directory, a payroll directory, a network directory (e.g. conforming to the Lightweight Directory Access Protocol (LDAP)), an electronic address book or a customer management system (sometimes referred to as a client or customer relationship management system). Such directories may contain names and other sensitive information relating to members, clients or customers of an organization and/or users of a particular network. Database 701 may be maintained as part of data processing platform 630, computer device 620 or elsewhere, e.g. in auxiliary server 105. Database 701 may be a copy or replica of a database that is maintained elsewhere.

Data processing platform 630 may check a text item (e.g. a word, a group of words or a number) against the content of database 701 to determine if that text item is to be masked. Desirably, for efficiency of processing, not every text item in a document is checked against database 710. For example, only text items containing words that do not appear in a dictionary are checked. Items that match predetermined patterns may be checked.

Figure 8:
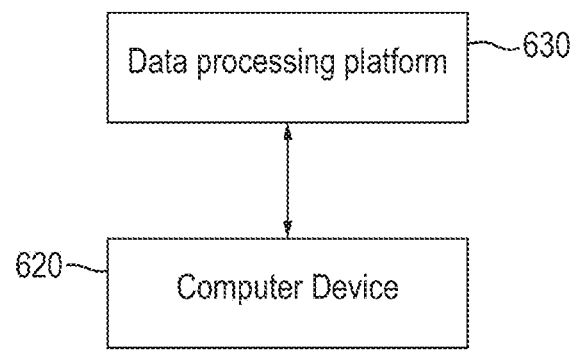
FIG. 8 shows communication flows in a first method of the invention using a single computer device.
Figure 9:
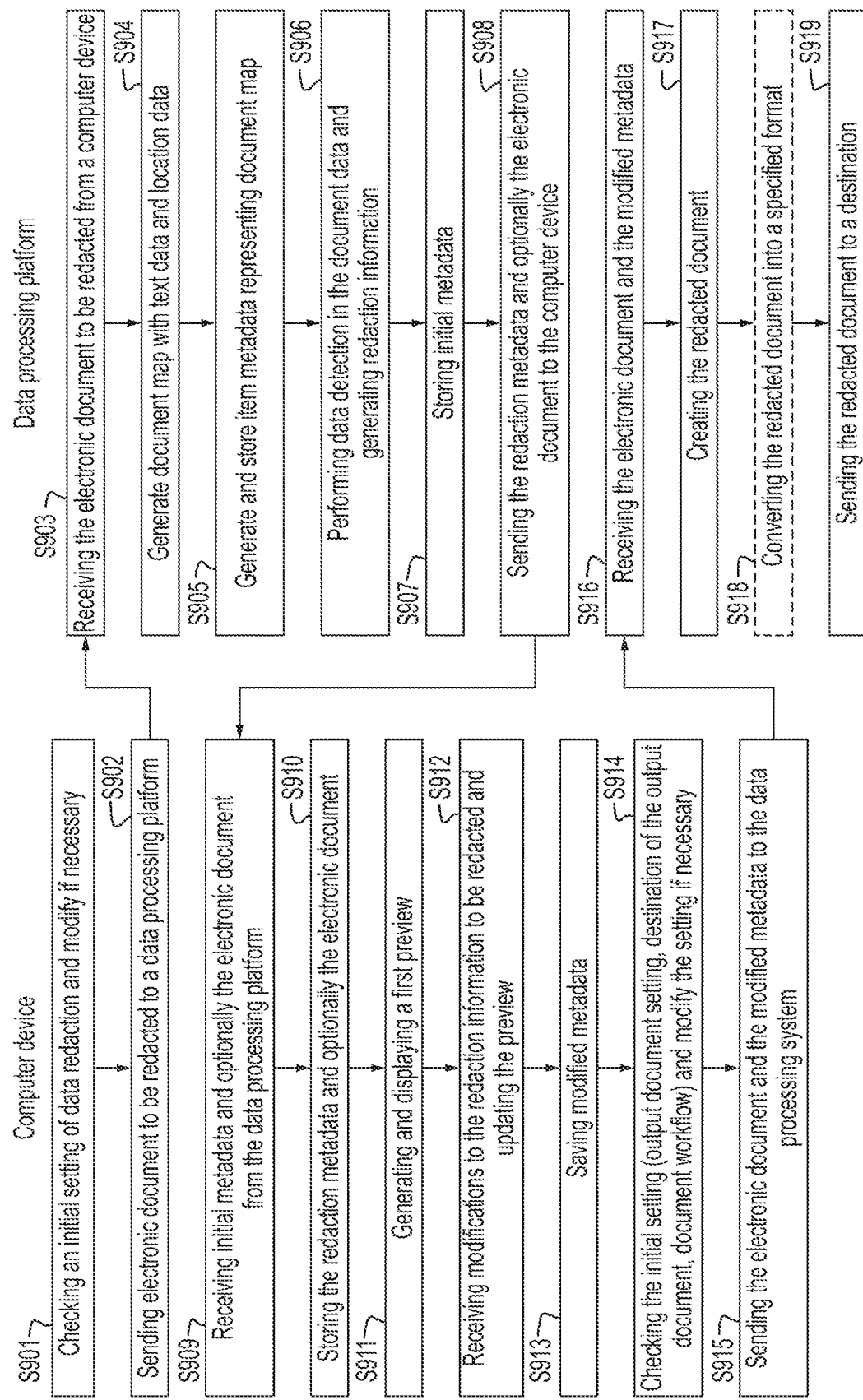
FIG. 9 is a flowchart showing the first method of the invention.

FIGS. 8 and 9 show in more detail a first method according to the invention in which the data processing platform 630 communicates with a computer device 620. As shown in FIG. 9, in a first step the computer device 620 displays (S901) for checking initial settings of the data redaction process and receives from the user any necessary modification of those settings. User interaction with a preview screen is described further below. Next, the electronic document comprising document data to be redacted is sent (S902) to the data processing platform 630 desirably via a secure communications method such as Transport Layer Security (TLS). As previously mentioned, the electronic document to be redacted may be obtained at the computer device via an image capture function or generated thereon or obtained from elsewhere.

The electronic document 103 to be redacted is received (S903) at the data processing platform 630 and decoded if an encrypted transmission protocol was used. The received document is processed (S904) to identify text therein and a document map indicating the text content of the document and the location of each text element is generated. The document map is an example of location data and may identify the locations of test elements using position coordinate data. Images, for example pictures and signatures, may also be identified and locations recorded in this step. The document map is stored (S905) as item metadata. A data detection process (S906) is performed on the electronic document and the corresponding item metadata to identify data items for potential redaction. Redaction information is generated and saved (S907) as initial metadata to be sent to the computer device 620.

The initial metadata desirably indicates specific items to be redacted as well as their corresponding locations in the document image and desirably the information category to which they belong. The initial metadata may specify rules or configurations defining what should be redacted, instead of or in addition to specific items to be redacted and may be referred to as redaction configuration information. The electronic document and the initial metadata are sent (S908) to the computer device 620. The initial metadata may be sent to the computer device 620 together with the electronic document so that linking between the metadata and the computer device can be maintained correctly. This would be helpful to reduce the risk that the potential redaction would not be precisely previewed. In another embodiment, only the initial metadata may be sent back to the computer device 620, relying on the computer device 620 having retained a copy of the electronic document 103. This can reduce bandwidth usage.

The communication interface 627 of the computer device 620 receives (S909) the initial metadata and optionally the electronic document from the data processing platform 630. The data redaction application 622 stores (S910) the initial metadata and the electronic document to be redacted in metadata storing unit 626b and in the document data storing unit 626a respectively. The preview generator 624 generates a first preview image which is displayed (S911) to the user on display 621. The computer device 620 receives input from the user to indicate any necessary modification of the items to be redacted in the electronic document.

Metadata modification unit 625 generates modified metadata representing the changes to the items to be redacted as indicated by the user input, causes the preview generator to generate a modified preview image and causes the first communication interface to communicate the modified redaction information to the data processing platform. This step may be repeated as often as necessary until the user is happy with the displayed the preview image of the redaction. On receipt of confirmation that the modification of the redaction information is complete, the data redaction application 622 stores (S913) modified metadata in memory unit 626. Then, the data redaction application 622 displays (S914) for confirmation by the user any other relevant settings, for example the format of the output document, destination of the output document and any document workflow to be applied. Following confirmation, and/or modification, of the relevant settings, the data redaction application 622 instructs communication interface 627 to send (S915) a pair of the updated metadata and the electronic document to the data processing platform.

The network communication interface 635 of the data processing platform 630 receives (S916) the modified metadata and the electronic document. Data redacted image file creating unit 633 turns (S917) the electronic document into the redacted document in which the redaction is applied irreversibly. Redactions are applied in the selected manner to the selected places in the document data. Desirably, the output document may be "flattened", that is reduced to a single layer of pixels with any text information or metadata removed.

Optionally, document file converter 634 converts (S918) the redacted document to a different desired format. Conversion of the document format can also be performed by the data redacted image file creating unit 633 in the redaction process. Finally, the network communication interface 635 sends (S919) the redacted document to the specified communication destination 640. Sending the document can be performed using any suitable method, for example SMTP to send the document to an email address or FTP to upload the document to a remote storage location. If the document is to be sent to another cloud service, the application programming interface (API) of that service can be used. Metadata generated in the redaction process may also be sent to such a cloud service and, for example, used to apply tags or for classification.

It will be appreciated that method of the invention can be performed in a single session. In other words, the user conducts the initial checking step (S901) and sends (S902) the electronic document to be redacted to the data processing platform 630 then waits to receive the proposed redactions, modifies or confirms the preview image of the redaction and sends the modified metadata back to the data processing platform 630. Alternatively, the steps of initially sending the original document to the data processing platform 630 and subsequently modifying or confirming the proposed redactions can be performed at separate times and/or at separate devices. A user may send multiple original documents in one session and subsequently modify or confirm the redactions in a different session.

Figure 10:
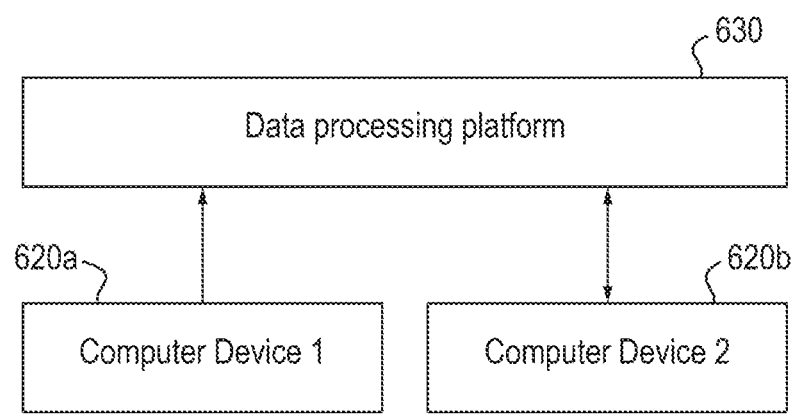
FIG. 10 shows communication flows in a second method of the invention.
Figure 11:
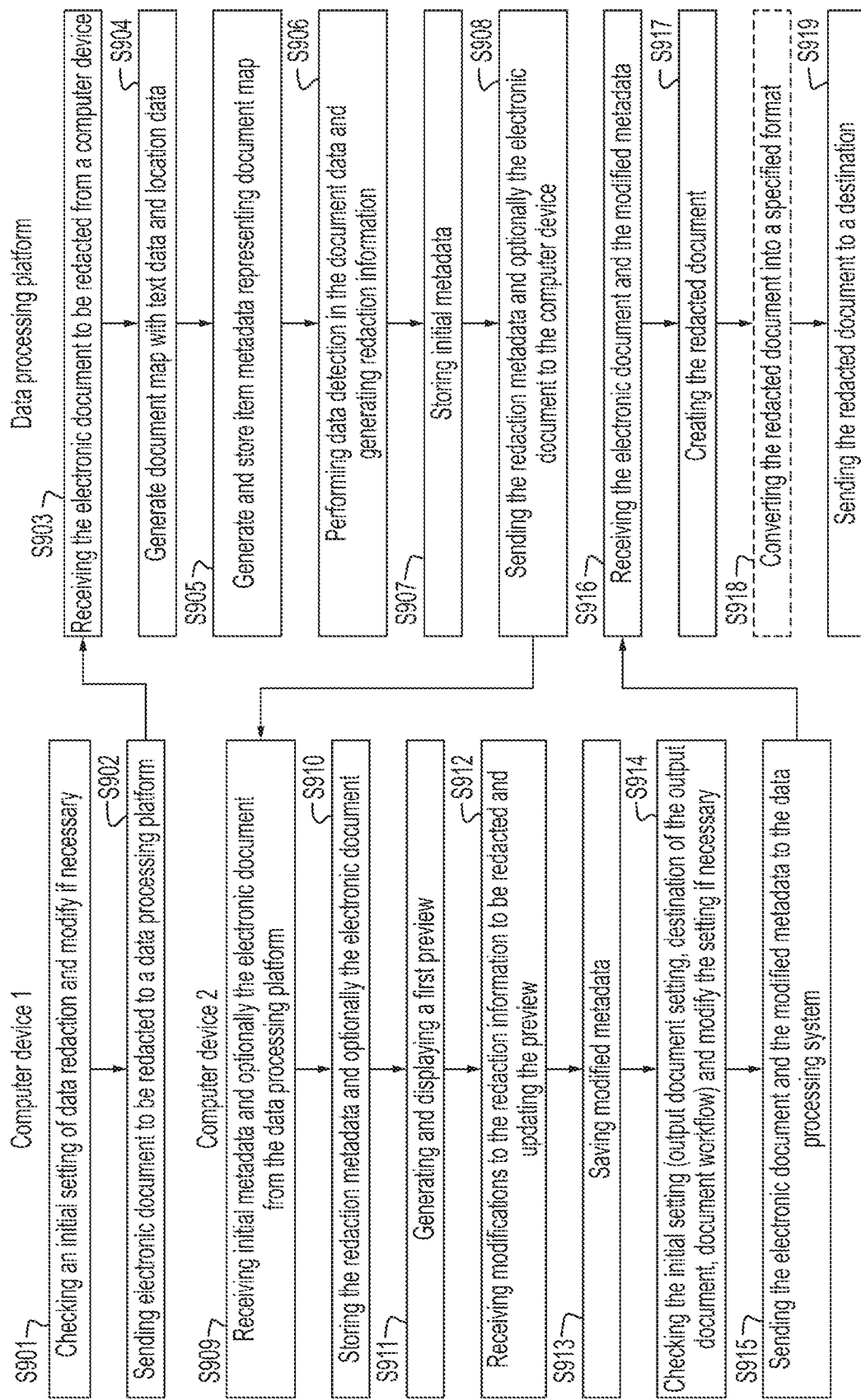
FIG. 11 is a flowchart showing the second method of the invention.

Another method where steps are performed by the user at different devices is shown in FIGS. 10 and 11. In FIG. 11 the same steps are performed as in FIG. 9 and these are labelled with the same references. The method of FIG. 11 differs from the method of FIG. 9 in that the initial steps (S901), (S902) are performed by the user at a first computer device 620a whilst the later modification/confirmation steps (S909) to (S915) are performed at a second computer device 620b. The method of FIG. 11 is particularly adapted for bulk processes or workflows involving multiple people since a first user at a first computer device may generate or select the document to be redacted whilst a second user at the second computer device can modify or confirm the redaction to be applied. In a bulk process where many similar documents are to be processed, settings that are modified for one document can usefully become defaults for processing of the next document.

Figure 12:
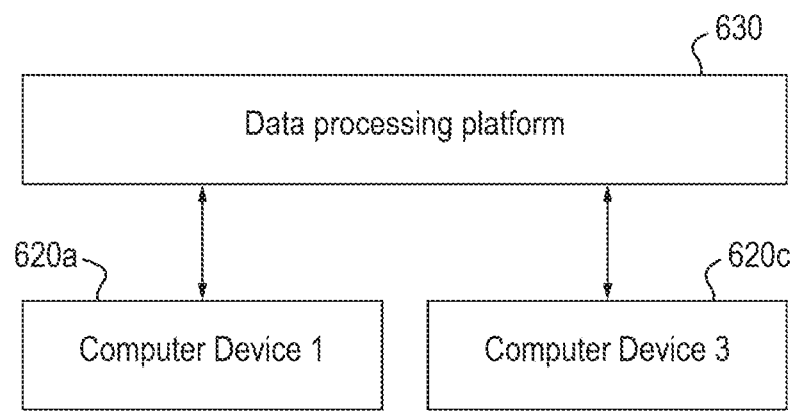
FIG. 12 shows data flows in a third method of the invention.
Figure 13A:
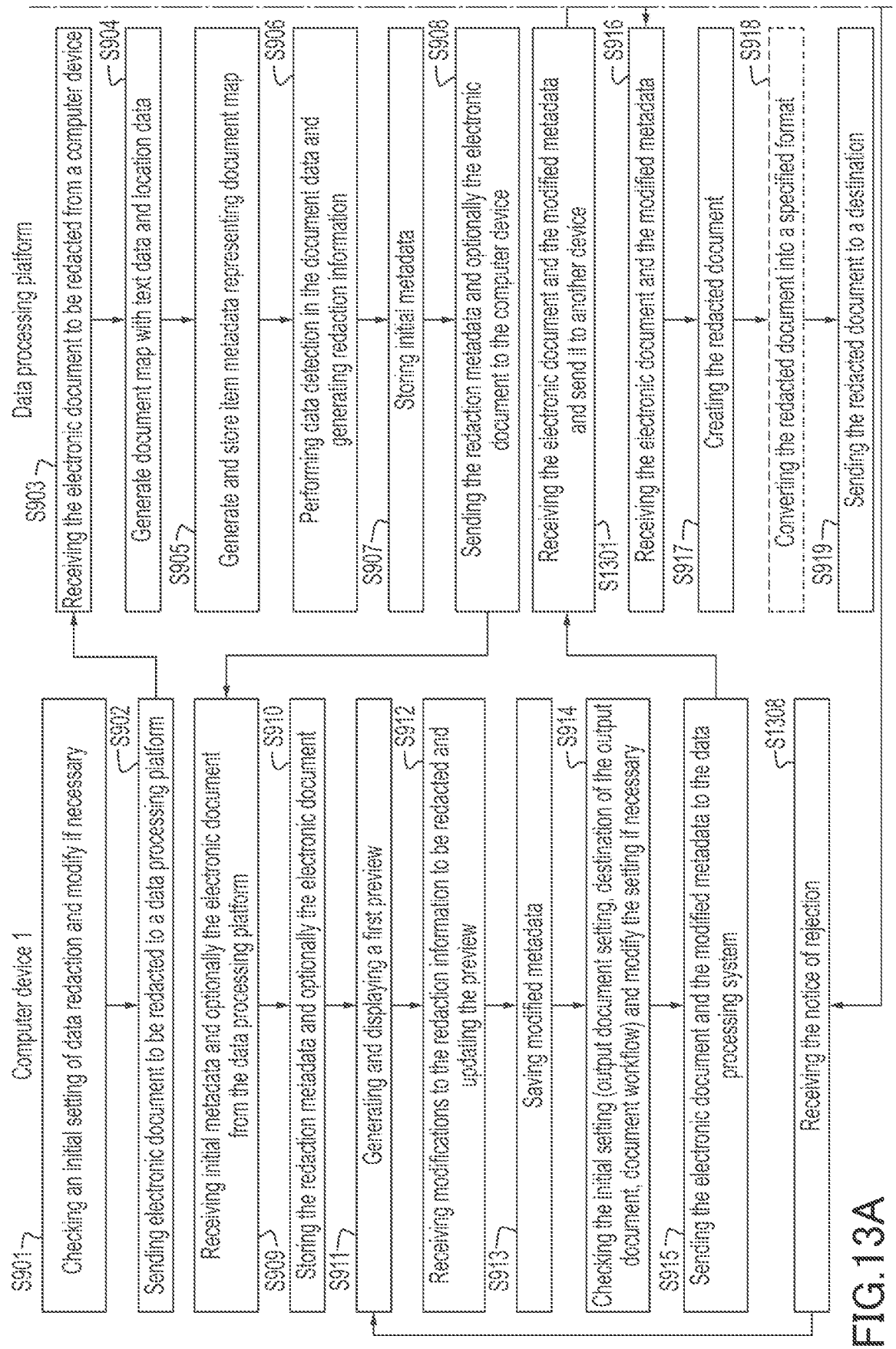
FIGS. 13A and 13B are a flowchart showing the third method of the invention.
Figure 13B:
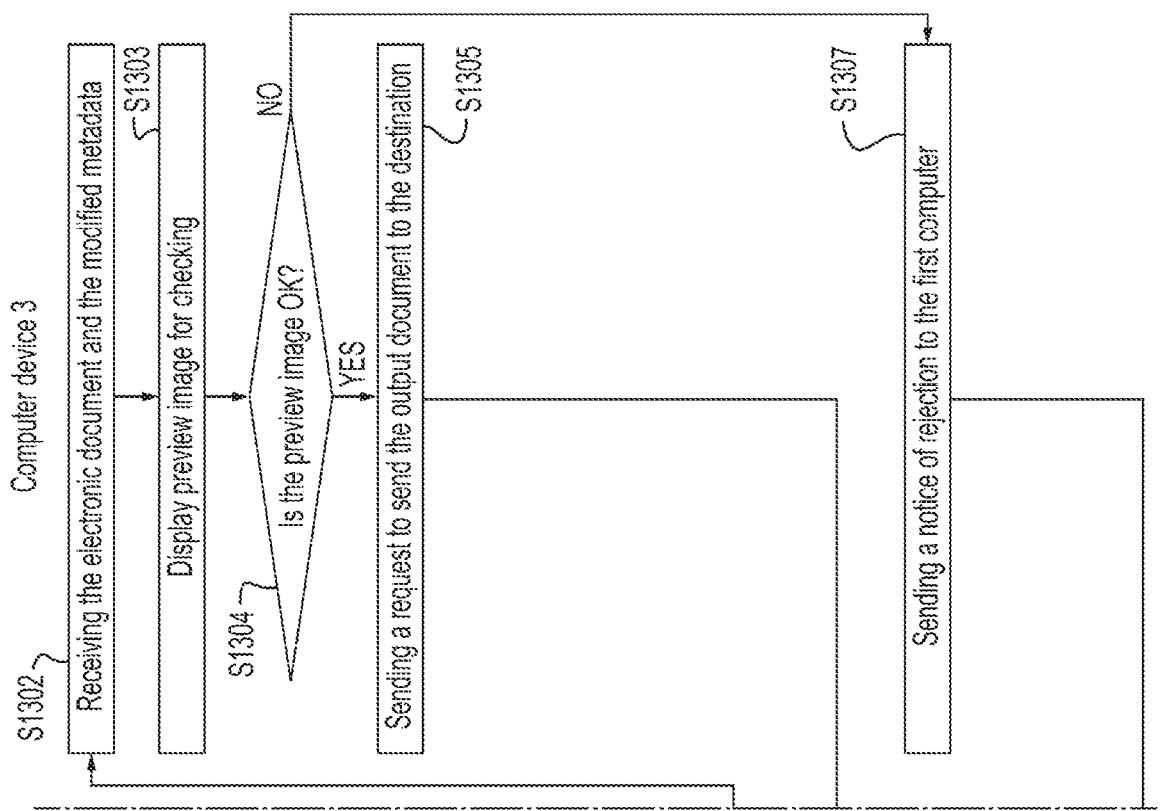

Embodiments of the present invention can incorporate other processes and/or be incorporated in a wider document processing workflow. For example, the present invention can be embodied in a method that includes a step of approval of proposed redactions. Such a method is shown in FIGS. 12 and 13A, 13B. In FIGS. 13A and 13B, steps that are the same as steps of FIG.

9 are denoted with the same references and are not described further herein.

The method of FIGS. 13A and 13B proceeds through the same steps as the method of FIGS. 9 and 11 to the point where the electronic document and updated metadata are sent (S913) to the data processing platform. On receipt of the electronic document and the updated metadata, the data processing platform sends (S1301) the electronic document and the updated metadata to a third computer device 620c. The third computer device 620c receives (S1302) the electronic document and the updated metadata and displays (S1303) the preview image for checking. Third computer device 620c receives (S1304) from a user of the third computer device 620c a confirmation that the preview image is okay or an indication that it is not. The user operating the third computer device 620c is desirably a different individual to the user operating the first computer device 620a. The two users may have different privileges in the network. If the preview image has been confirmed to be okay, the third computer device 620c sends (S1305) a request that the output document be sent to its destination to the data processing platform 630. The data processing platform 630 receives (S1306) the command from the third computer device 620c and continues with the creating, converting and sending steps (S917) to (S919) as in the method of FIG. 9.

In another variation of the method of FIGS. 13A and 13B, the user of the third computer device 620c modifies the redaction using preview screens as described below.

Modified Redaction information is then generated by the third computer device 620c and sent to the data processing platform 630 for generation, etc. of the redacted document.

If the preview image is indicated not to be okay, the third computer device 620c sends (S1307) a notice of rejection to the first computer device 620a. The notice of rejection may include an indication of why the redaction is not okay. On receipt (S1308) of the notice of rejection, the first computer device 620a repeats the step of generating a preview (S911) and receiving modifications (S912) to the redaction modification/confirmation settings, as well as the subsequent steps (S913) to (S915) whereby the document and further updated metadata are sent to the data processing platform 630. Of course, approval and modification of the redaction information can be repeated several times to ensure the appropriate modification is applied.

Figure 2:
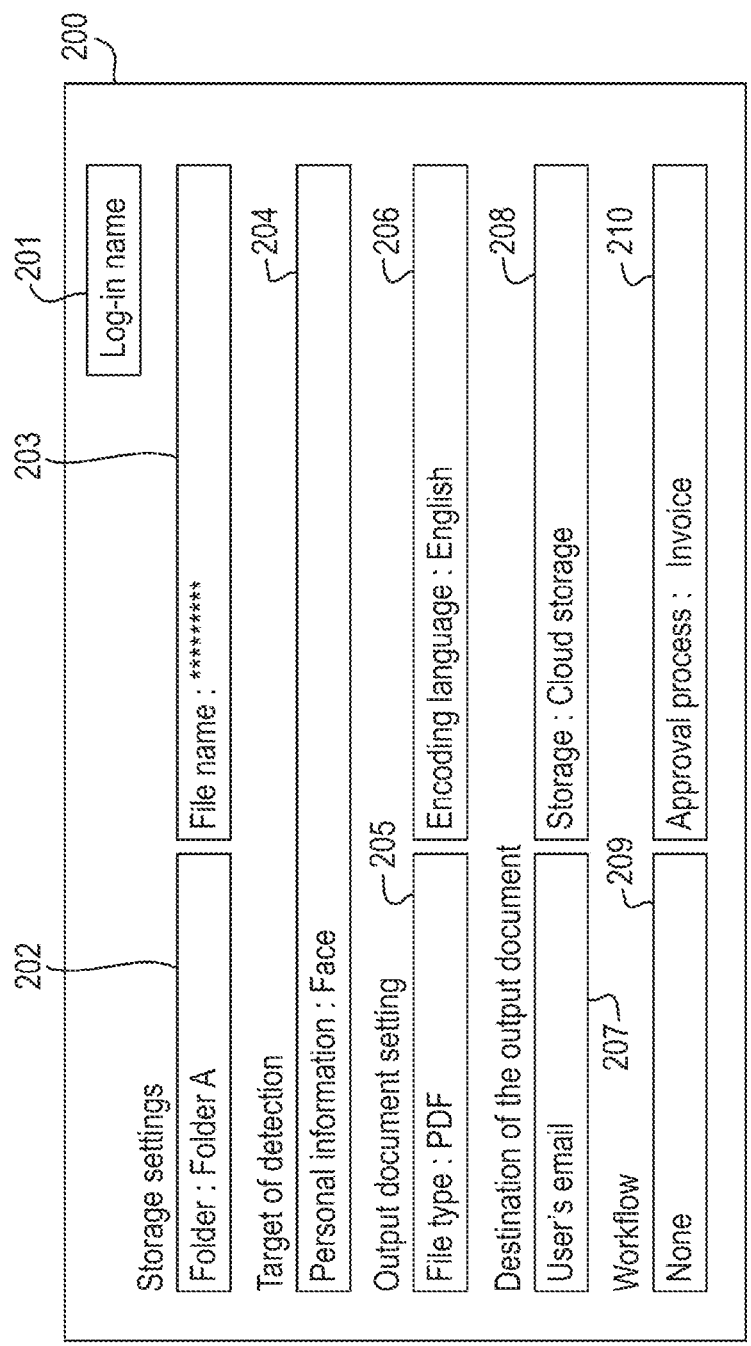
FIG. 2 shows a top level menu screen in an embodiment of the invention.

FIG. 2 shows a menu screen 200 that can be used by the user to instruct the instigation of the process. The menu screen may include indication 201 of the user's log-in name. Various default actions and settings may be associated with a user's account and loaded when the user identifies themselves by logging in.

Screen 200 also includes options to allow the user to specify storage settings such as a storage destination 202 (e.g. a folder in a file system) and a file name 203. The file name may include a file type denoted by a standard extension such as ".pdf".

A detection target menu option 204 allows the user to specify what types of sensitive information in a document to be processed are to be detected and redacted. Information detection and redaction settings may be set via sub-menus as described below. The user may be enabled to select multiple types of sensitive information.

Output document setting items include an option to specify an output file type 205 and an output encoding language 206. Output file type may be any suitable file type.

Destination options may include a destination account ID 207 (e.g. using a user's email address) and a destination identification 208. Destination identification 208 may comprise a URI or a predefined alias for a service with a known URI. Optionally, there may be provided a menu item to enable selection of whether a workflow process 209 is to be performed and if so a menu item 210 to select a specific process to be followed.

Figure 3:
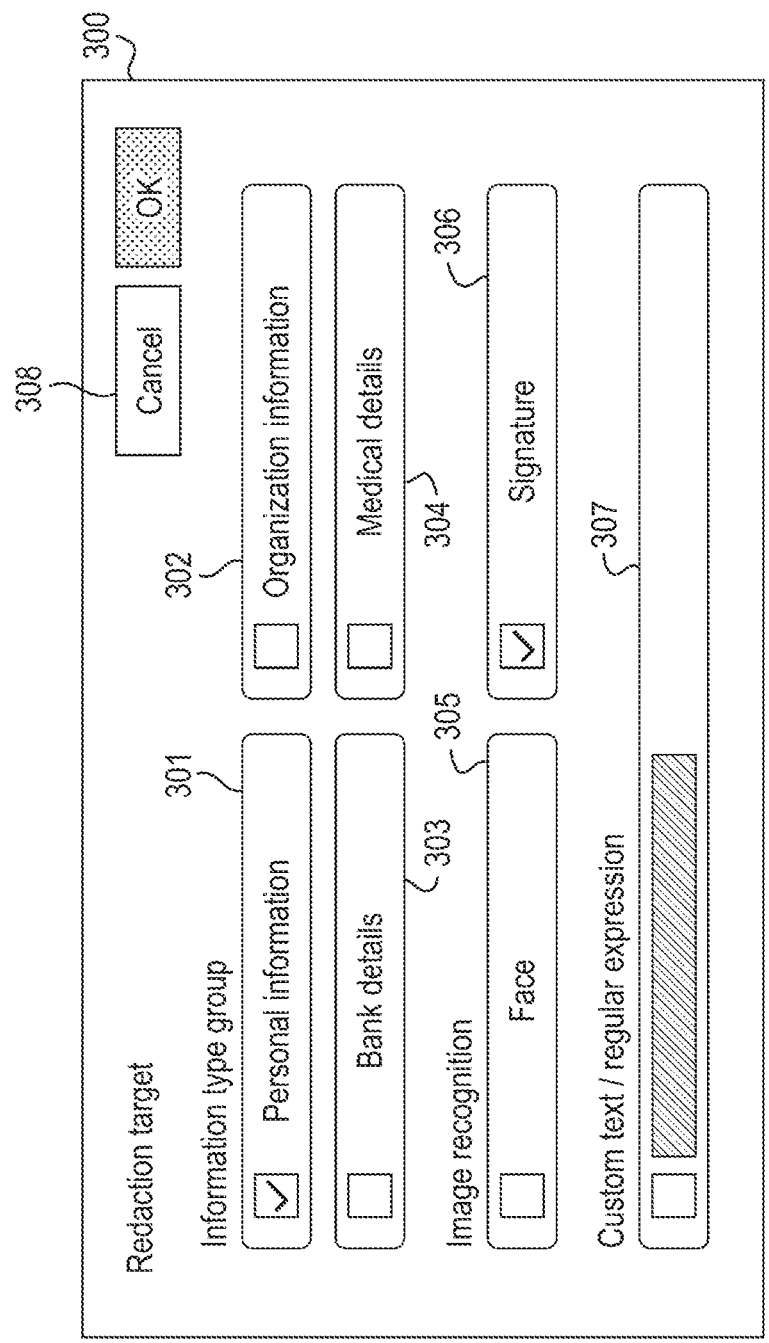
FIG. 3 shows a menu screen for selecting items to be redacted in an embodiment of the invention.

FIG. 3 shows a redaction target submenu 300 by which a user may select specific types of information to be automatically detected and redacted. Redaction target submenu 300 may be reached by selecting the detection target menu item in main menu 200.

Redaction target submenu 300 may include selection elements 301 to 304, e.g. checkboxes, by which the user can select predefined categories of information to be detected and redacted. The predefined categories may depend upon the specific application to which the invention is to be put, but a particularly important type of information is personal information relating to individuals, particularly identifying information and sensitive personal information. Other possible types of information may include organizational information, financial information and/or medical information.

Categories of information may be organized in a hierarchy according to a predetermined level of sensitivity. For example, a hierarchy from most sensitive to least sensitive might be: personal identifying information, sensitive personal information, medical information, organizational information. The user may control what information is to be redacted by specifying a level on the hierarchy so that all information in or above that level is redacted.

Redaction target submenu 300 may further include additional selection elements 305, 306 to enable selection of predefined image recognition tasks to be carried out on electronic document 103. Image recognition tasks to be performed may include face recognition and signature recognition amongst others. In addition, a custom entry 307 may be provided to allow the user to define a custom search to be performed on the text of the electronic document 103. A custom search may be defined using characters or wild cards or, in more complex cases, regular expressions.

Redaction target submenu 300 also includes a cancel element 308 which the user can select to cancel changes made and a confirmation element 309 through which the user can confirm changes and return to the main menu screen.

Figure 4:
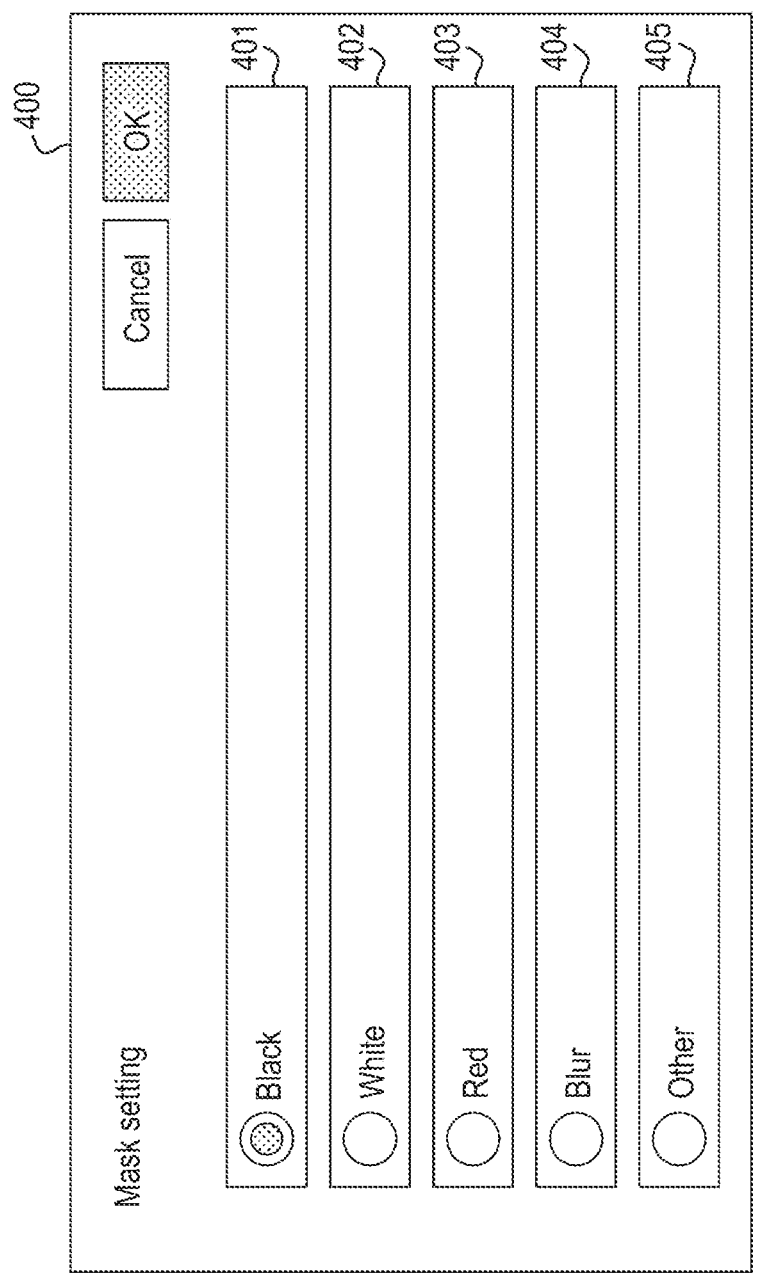
FIG. 4 shows a menu screen for selecting a method of redaction in an embodiment of the invention.

FIG. 4 shows a redaction type submenu 400 through which the user may select a type of redaction to be applied to sensitive data in the electronic document 103. Redaction type submenu 400 may comprise a set of selection elements 401 to 405, e.g. in the form of radio buttons. Radio buttons are a set of options that are mutually exclusive so that only one can be selected at a time; selection of a new option automatically cancels a previous selection. Possible masking processes to be carried out can include options of different colour masks to be applied (e.g. black, white or red), a blur or "pixelation" process or other processes. Other processes, as described further below, may include replacement of sensitive data with dummy data or pseudonymous data. Combinations of different types of redaction may be applied. For example the sensitive data may be replaced by dummy data, then pixelated or blurred. This ensures that the original information cannot be recovered or guessed at (e.g. based on the length of the redaction) whilst at the same time preserving the look of the original document; large blocks of solid colour used in traditional redaction processes can be considered unsightly.

Figure 5:
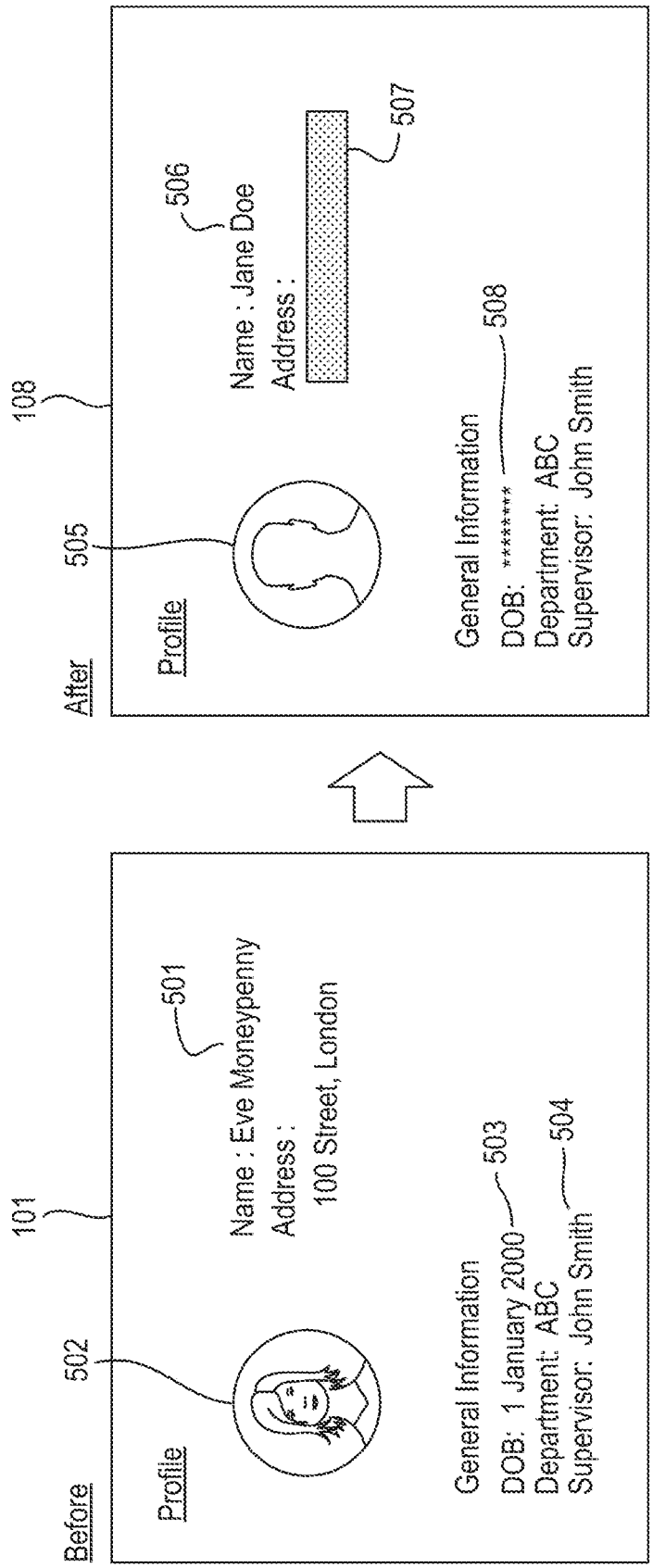
FIG. 5 shows a document before and after redaction in an embodiment of the invention.

An exemplary input document 101 and corresponding output document 108 are shown in FIG. 5. The original document 101 may be, for example, a profile of an employee of an organization. The profile may include personal identification information 501 such as a name, in this example "Eve Moneypenny", and an address. There may also be an image 502, e.g. a headshot of the individual who is the subject of the profile. The profile may further include sensitive personal information 503 such as a date of birth. Other sensitive personal information might include gender, ethnicity or religious affiliation. Organizational information 504, such as the individual's departmental affiliation and/or supervisor, may further be included.

In the redacted output document 108, selected information in the document is redacted. In this example, different redaction methods have been applied to different elements of the original document 101 but it is also possible to apply the same redaction method to all elements that are redacted. In this example, part of the personal information 501, specifically the name "Eve Moneypenny", has been replaced by pseudonymous information 506, specifically the dummy name "Jane Doe". Other parts of the personal identifying information 501 have been replaced by a solid block of colour 507. In some cases, replacement of original information by pseudonymous information can make it easier to understand the nature and context of the redacted document.

As shown in FIG. 5, the image 502 has been replaced by a silhouette 505. It would also be possible to replace the original image with a stock image or a synthetically generated image but that might be confusing if it is not clearly indicated that the replacement image is not the original. Any such confusion might be reduced by blurring or pixelating the replacement image. A yet further redaction option is illustrated in relation to the sensitive personal information 503, where a date of birth is replaced by a string of asterisks 508. Of course, other characters can be used instead. In some cases it is desirable that replacement text or symbols match the format or length of the redacted information, e.g. to make it clear that a date or telephone number has been redacted. In other case it is desirable that the replacement text or symbols do not match the replaced information as this might give away information, e.g. by indicating the order of magnitude of a sum of money or the length of a name.

Figure 14:
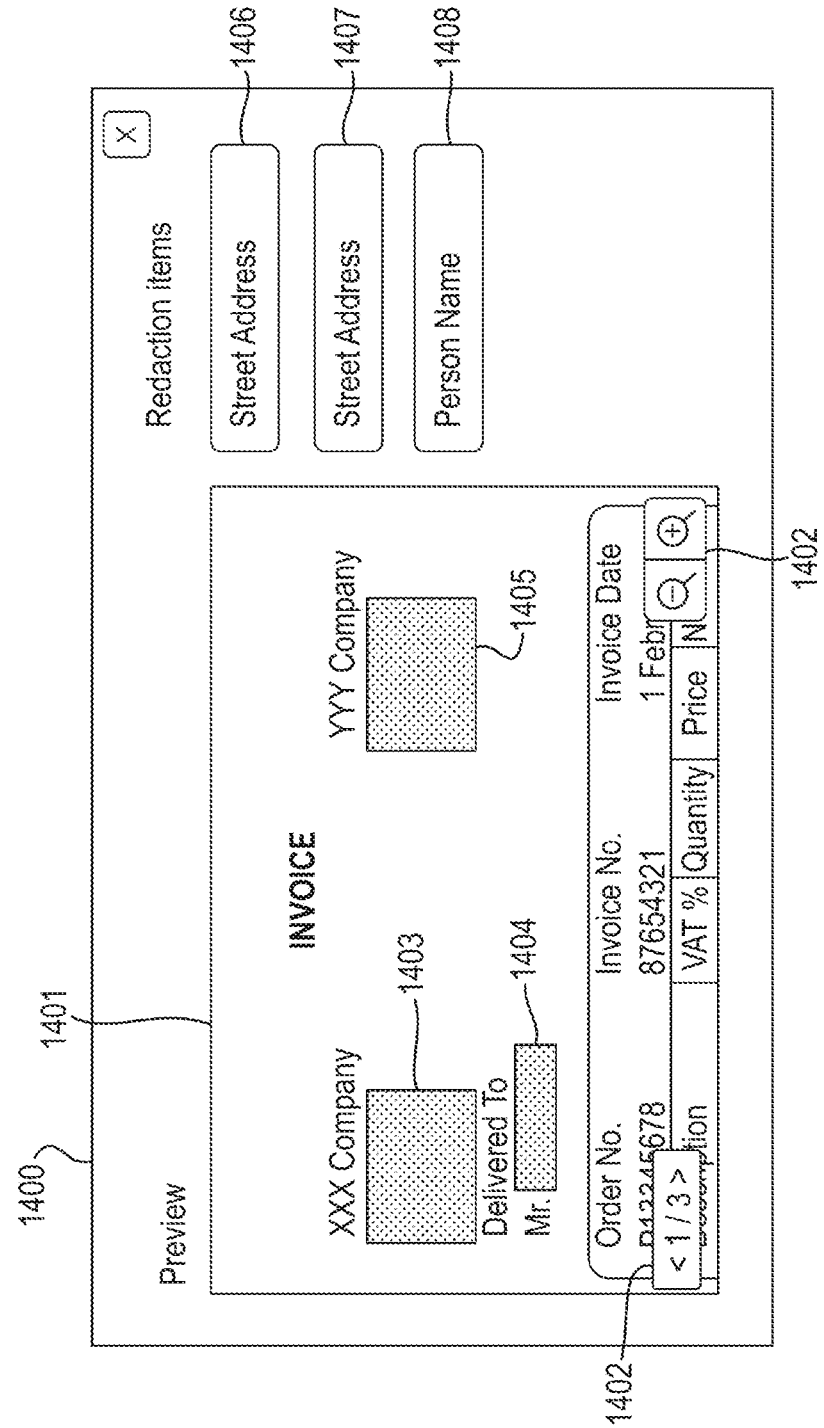
FIGS. 14 to 17 show preview screens in an embodiment of the invention.

Interfaces to enable a user to preview, modify and confirm redactions to be applied to electronic document are described below. These screens may be used in any embodiment of the invention. FIG. 14 depicts a preview screen 1400 showing redactions to be applied to the electronic document 103. A page image 1401 shows a page, for example, the first page, of the electronic document 1401. Redaction masks 1403 to 1405 are shown covering respective items of sensitive information. Corresponding item buttons 1406 to 1408 are displayed adjacent page image 1401. Navigation buttons 1402 are provided to allow the user to change the zoom level of the page image 1401 and to navigate between pages of the document if it is a multipage document.

Figure 15:
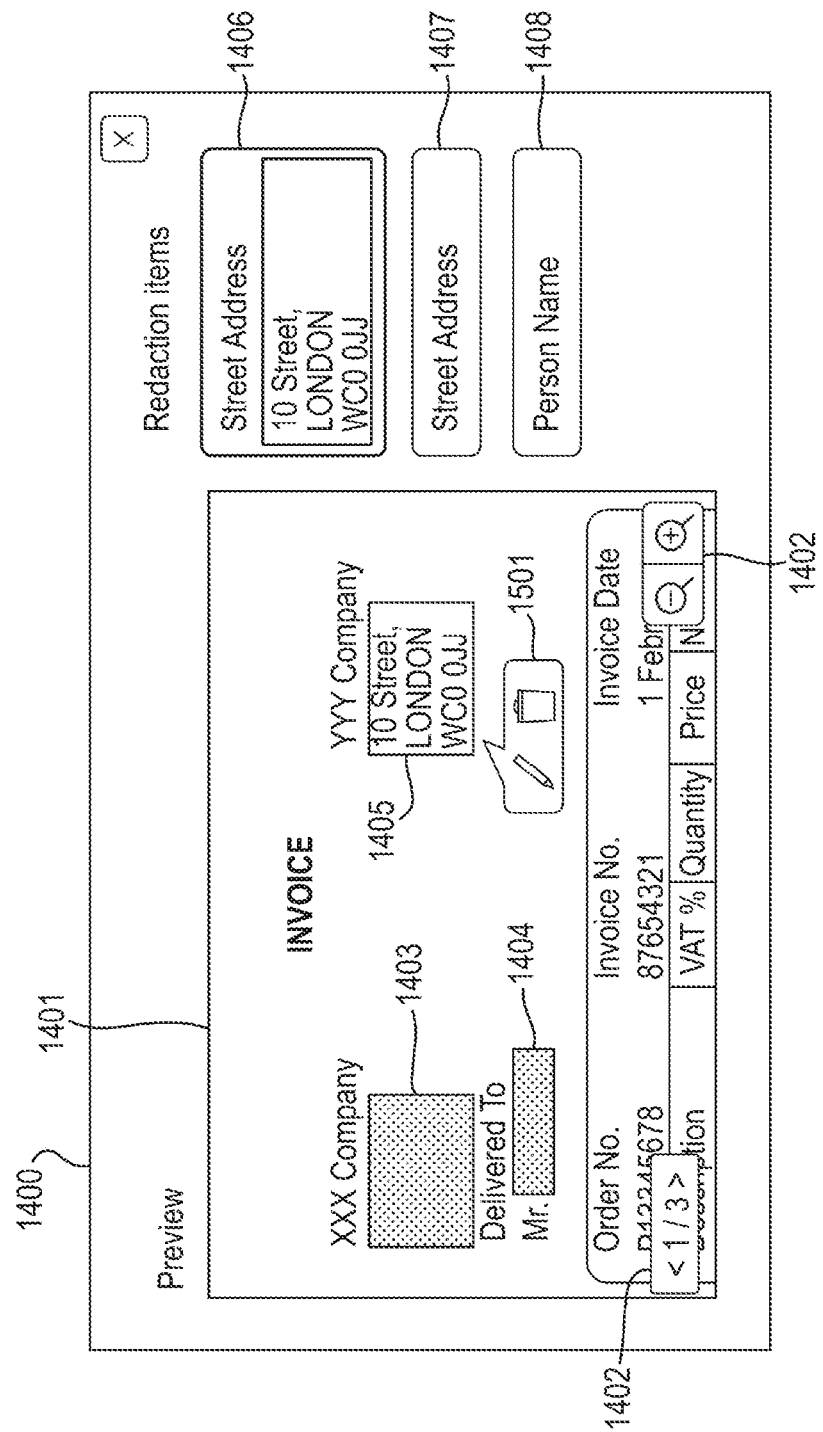

If the user selects a redaction item, e.g. by selecting the relevant redaction mask 1405 or the corresponding item button 1406, the information to be redacted is shown as depicted in FIG. 15. If the display device is a touch screen, selection of items can be performed simply by pressing on them. Alternatively or in addition, a mouse or other like device can be used to move a pointer around the screen to select items or cursor (arrow) keys can be provided to cycle a cursor or selection element around selectable items in the view. Display of the information of the selected redaction item can be performed, for example, by making the redaction mask partly transparent or just an outline. The sensitive information can also be displayed in the corresponding item button 1406. A pop-up menu 1501 appears, e.g. adjacent the selected reaction item, to allow the user to edit the redaction item or delete it entirely.

Figure 16:
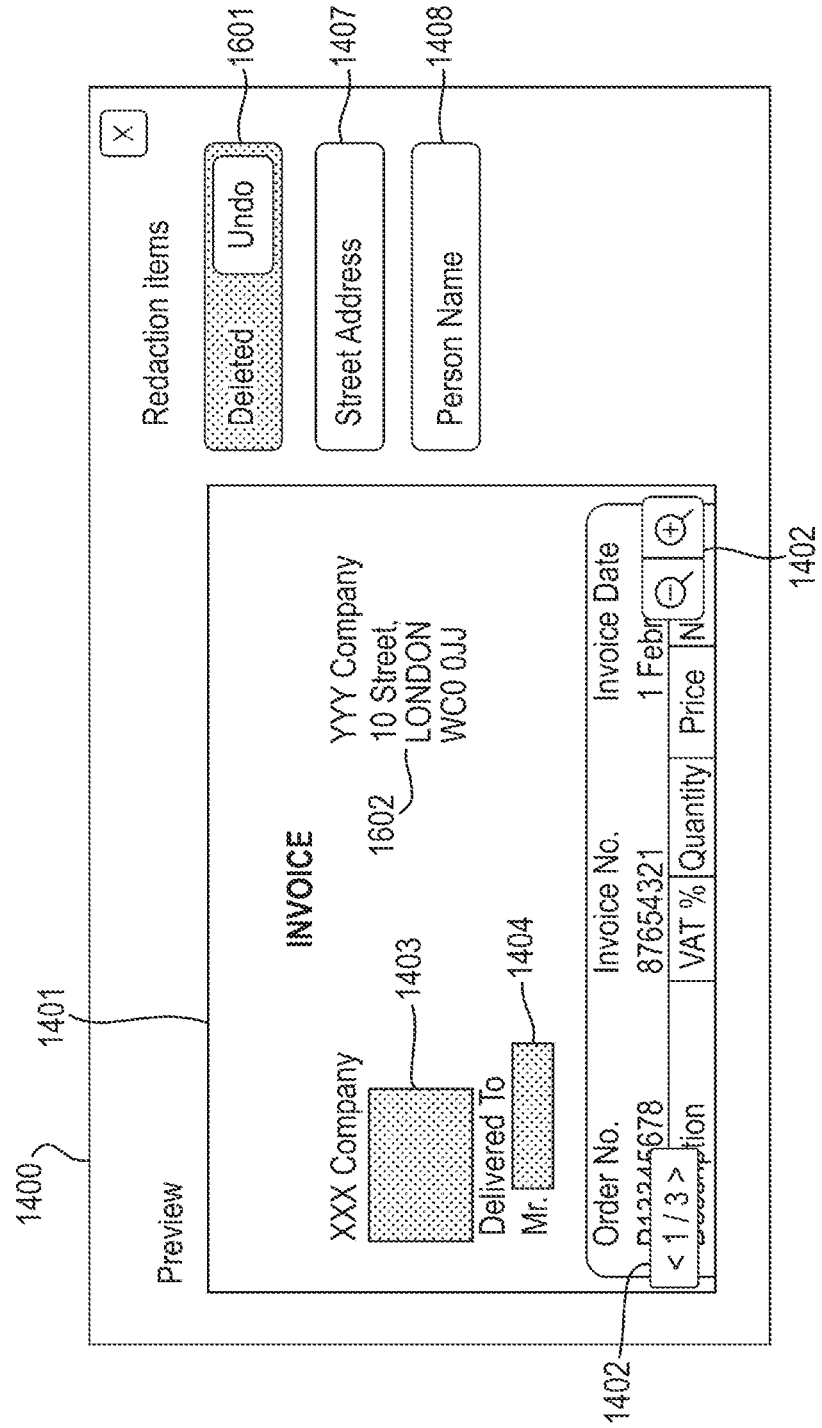

If the user selects to delete the redaction item, the redaction mask is removed, as depicted in FIG. 16, so that the corresponding item of information 1602 is now displayed. The corresponding item button can be replaced with an undo button 1601 that allows the user to undo deletion of the mask item. If the user selects to unmask an item of information, an option may be presented to unmask all instances of that item in the electronic document.

Figure 17:
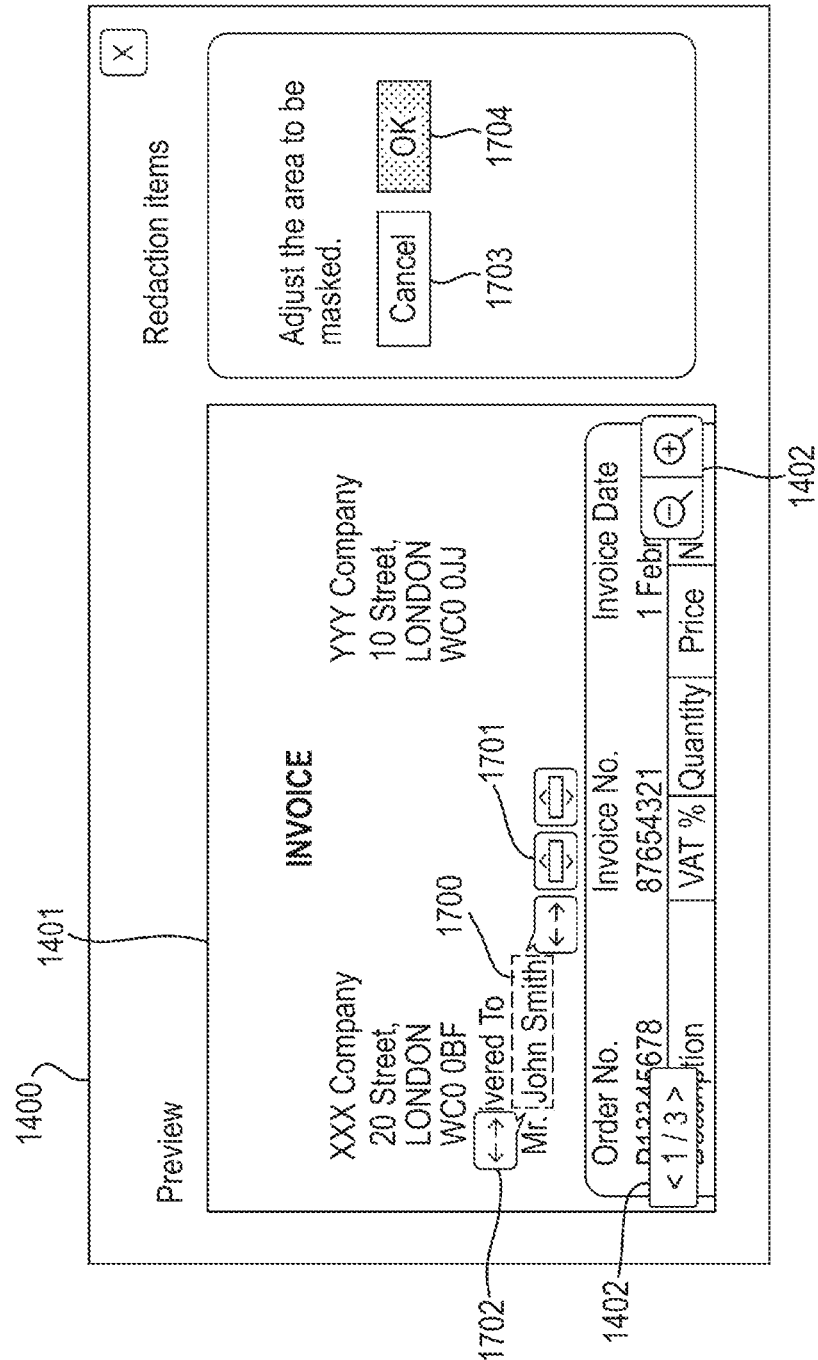

FIG. 17 shows an option to allow the user to add additional redactions to the document. Addition of a redaction item can be initiated by selecting an un-redacted area of the preview image, e.g. by tapping on that part of the display if the display is a touch sensitive screen. When the user taps of the screen an initial mask 1700 is displayed. The initial mask 1700 may be a default size or the redaction application may automatically determine a size of initial mask that covers one or more text items (e.g. words) at the point of the user touching the screen. Adjustment buttons 1701, 1702 may be provided to allow the proposed masked area to be adjusted in height and/or width. Alternatively, the area to be masked can be adjusted by selecting and dragging edges or corners of the initial mask area. A cancel button 1703 can be provided to allow the user to cancel the proposed addition of a redaction item. A confirmation button 1704 is provided to allow the user to confirm that the redaction needs to be applied. When the user selects an additional item to be redacted, an option to redact all instances of that item in the document may be provided.

Alternatively or in addition, an additional menu item that is displayed alongside the preview image can be provided to allow the user to select additional items in the preview image for redaction.

CONCLUSION

The methods of the present invention may be performed by computer systems comprising one or more computers. A computer used to implement the invention may comprise one or more processors, including general purpose CPUs, graphical processing units (GPUs), tensor processing units (TPU) or other specialized processors. A computer used to implement the invention may be physical or virtual. A computer used to implement the invention may be a server, a client or a workstation. Multiple computers used to implement the invention may be distributed and interconnected via a network such as a local area network (LAN) or wide area network (WAN). Individual steps of the method may be carried out by a computer system but not necessarily the same computer system. Results of a method of the invention may be displayed to a user or stored in any suitable storage medium. The present invention may be embodied in a non-transitory computer-readable storage medium that stores instructions to carry out a method of the invention. Any suitable programming language may be used to implement the invention. Input and output files of the present invention may be encoded in any suitable open or proprietary format (e.g. Portable Document Format (PDF), Open document Format for Office Applications (ODF), DOCUMENT format (.doc), Open Office XML (.doex), Joint Photographic Experts Group (.jpeg) JPEG2000, Portable Network Graphics (.png), Tagged Image File Format (TIFF)). The present invention may be embodied in a computer system comprising one or more processors and memory or storage storing instructions to carry out a method of the invention. The present invention may be incorporated into a multi-function peripheral device (e.g. having functionality to perform one or more of printing, scanning, copying, communicating) or into software updates or add-ons for such a device.

Having described the invention it will be appreciated that variations may be made on the above described embodiments which are not intended to be limiting. The invention is defined in the appended claims and their equivalents.

What is claimed is:

1. A system configured for redacting data on image data comprising:
    a device including a display;
    one or more processors; and
    one or more memories communicatively coupled to the one or more processors, the one or more memories storing instructions which, when processed by the one or more processors, cause the processor to:
        receive input of a setting a destination of an output document via the display;
        receive input of a detection setting to be redacted via the display;
        generate initial metadata for an electronic document, which is created by capturing an image of a physical original, said initial metadata including redaction information according to the detection setting and items identified in said electronic document;

generate from the initial metadata and the electronic document a preview image indicating redactions to be applied to the electronic document;

receive a user action detected at the preview image by the display, said user action including at least one of selecting an additional item to be redacted or selecting unmask a previously redacted item at the preview image;

generate modified metadata in response to the detected user action, wherein generating the modified metadata includes:

displaying, upon determining that the user action includes selecting the additional item to be redacted by selecting an area which is not redacted, options on the display to redact and not to redact all of a plurality of same items as the selected item within the electronic document; and/or displaying, upon determining that the user action includes selecting to unmask the previously redacted item by selecting a previously redaction mask, options on the display to unmask and not to unmask all of a plurality of same items as the selected previously redacted item within the electronic document;

automatically generate a modified preview image based on a selection of an option among the option to redact and not to redact all of the same items the selected additional item in the electronic document and/or a selection of an option among the options to unmask and not to unmask all of the plurality of the same items of the related selected previously redacted item in the electronic document, and send the output document which is redacted according to the modified metadata to the destination.

2. The system according to claim 1, wherein the output document is an image data created by the modified metadata and the electronic document.

3. The system according to claim 1, wherein the instructions, after generating a modified metadata, further cause the one or more processors to display the modified preview image on a different device to be checked before sending the output document to the destination.

4. The system according to claim 1, wherein the different device is decided based on a workflow setting which is set from the display.

5. The system according to claim 1, wherein the device comprises a scanner; and
the electronic document is created by the scanner.

6. The system according to claim 1, wherein the display is a touch panel.

7. The system according to claim 5, wherein the device is a multifunction peripheral device.

8. A computer-implemented method of redacting data on image data performed by a system including a device including a display, said method comprising:

receiving input of a setting a destination of an output document via the display;

receiving input of a detection setting to be redacted via the display;

generating initial metadata for an electronic document, which is created by capturing an image of a physical original, said initial metadata including redaction information according to the detection setting and items identified in said electronic document;

generating from the initial metadata and the electronic document a preview image indicating redactions to be applied to the electronic document;

receiving a user action detected at the preview image by the display, said user action including at least one of selecting an additional item to be redacted or selecting unmask a previously redacted item at the preview image;

generating modified metadata in response to the detected user action, wherein generating the modified metadata includes:

displaying, upon determining that the user action includes selecting the additional item to be redacted by selecting an area which is not redacted, options on the display to redact and not to redact all of a plurality of same items as the selected item within the electronic document; and/or displaying, upon determining that the user action includes selecting to unmask the previously redacted item by selecting a previously redaction mask, options on the display to unmask and not to unmask all of a plurality of same items as the selected previously redacted item within the electronic document;

automatically generating a modified preview image based on a selection of an option among the option to redact and not to redact all of the same items the selected additional item in the electronic document and/or a selection of an option among the options to unmask and not to unmask all of the plurality of the same items of the related selected previously redacted item in the electronic document, and sending the output document which is redacted according to the modified metadata to the destination.

9. The computer-implemented method according to claim 8, wherein the output document is an image data created by the modified metadata and the electronic document.

10. The computer-implemented method according to claim 9, wherein the instructions, after generating a modified metadata, further cause the one or more processors to display the modified preview image on a different device to be checked before sending the output document to the destination.

11. The computer-implemented method according to claim 9, wherein the different device is decided based on a workflow setting which is set from the display.

12. The computer-implemented method according to claim 8, wherein the device comprises a scanner; and
the electronic document is created by the scanner.

13. The computer-implemented method according to claim 8, wherein the display is a touch panel.

14. The computer-implemented method according to claim 12, wherein the device is a multifunction peripheral device.

* * * * *